United States Patent
Schultz et al.

(10) Patent No.: US 8,347,360 B2
(45) Date of Patent: Jan. 1, 2013

(54) SHARED DEVICE IDENTITY MANAGER

(75) Inventors: Paul T. Schultz, Colorado Springs, CO (US); Robert A. Sartini, Colorado Springs, CO (US); Martin W. McKee, Herndon, VA (US); Robert J. Whyley, Colorado Springs, CO (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 879 days.

(21) Appl. No.: 12/466,711

(22) Filed: May 15, 2009

(65) Prior Publication Data

US 2010/0293601 A1    Nov. 18, 2010

(51) Int. Cl.
| | | |
|---|---|---|
| G06F 7/04 | (2006.01) | |
| H04L 9/32 | (2006.01) | |
| G05B 19/00 | (2006.01) | |
| H04W 4/00 | (2009.01) | |
| H04W 28/26 | (2009.01) | |
| G06F 11/20 | (2006.01) | |
| G06F 15/173 | (2006.01) | |
| H04L 12/40 | (2006.01) | |

(52) U.S. Cl. ......... 726/4; 726/3; 726/5; 726/7; 713/168; 340/5.1; 370/338

(58) Field of Classification Search .................. 726/4, 5, 726/7, 3; 340/5.1; 370/338; 713/168
See application file for complete search history.

(56) References Cited

U.S. PATENT DOCUMENTS

| | | | | |
|---|---|---|---|---|
| 2007/0186106 | A1* | 8/2007 | Ting et al. | 713/168 |
| 2008/0062940 | A1* | 3/2008 | Othmer et al. | 370/338 |
| 2008/0100414 | A1* | 5/2008 | Diab et al. | 340/5.1 |
| 2009/0013380 | A1* | 1/2009 | Chandrasiri et al. | 726/3 |

FOREIGN PATENT DOCUMENTS

WO    WO 2010013152 A1 *  2/2010

OTHER PUBLICATIONS

Daeseon Choi; Seunghun Jin; Hyunsoo Yoon; "A User Friendly Internet Identity Management System"; Advanced Communication Technology, 2008. ICACT 2008. 10th International Conference on vol. 2 Digital Object Identifier: 10.1109/ICACT.2008.4493972; Publication Year: Feb. 2008, pp. 1163-1166.*

* cited by examiner

*Primary Examiner* — Matthew Smithers
*Assistant Examiner* — Courtney Fields

(57) ABSTRACT

A device receives an identity claim associated with a user of a shared device, and determines whether the identity claim is valid. The device also determines one of an individual identification or a group identification to affiliate with the shared device when the identity claim is determined to be valid. The device further provides one or more preferences and privileges to the shared device based on the one of an individual identification or a group identification affiliated with the shared device.

25 Claims, 15 Drawing Sheets

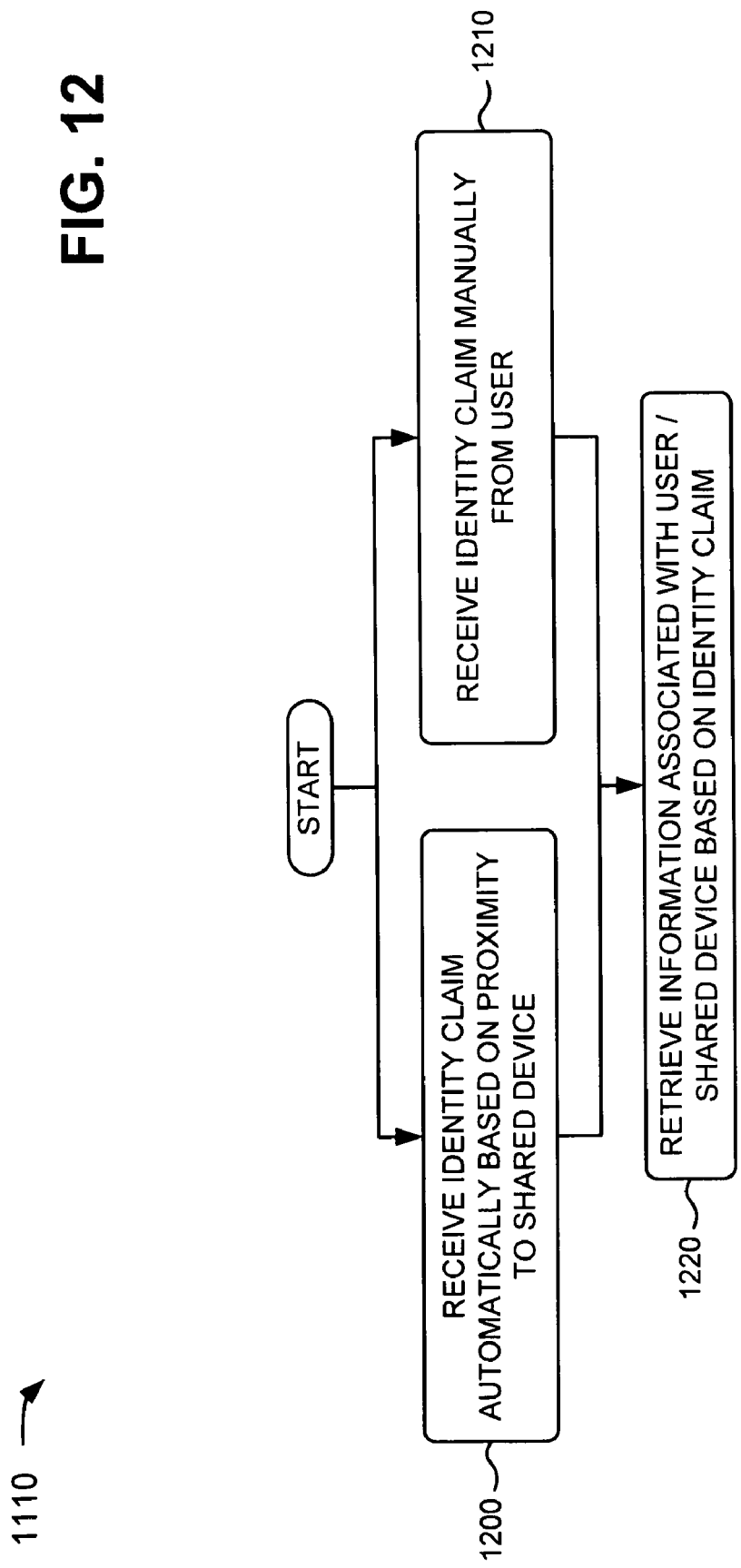

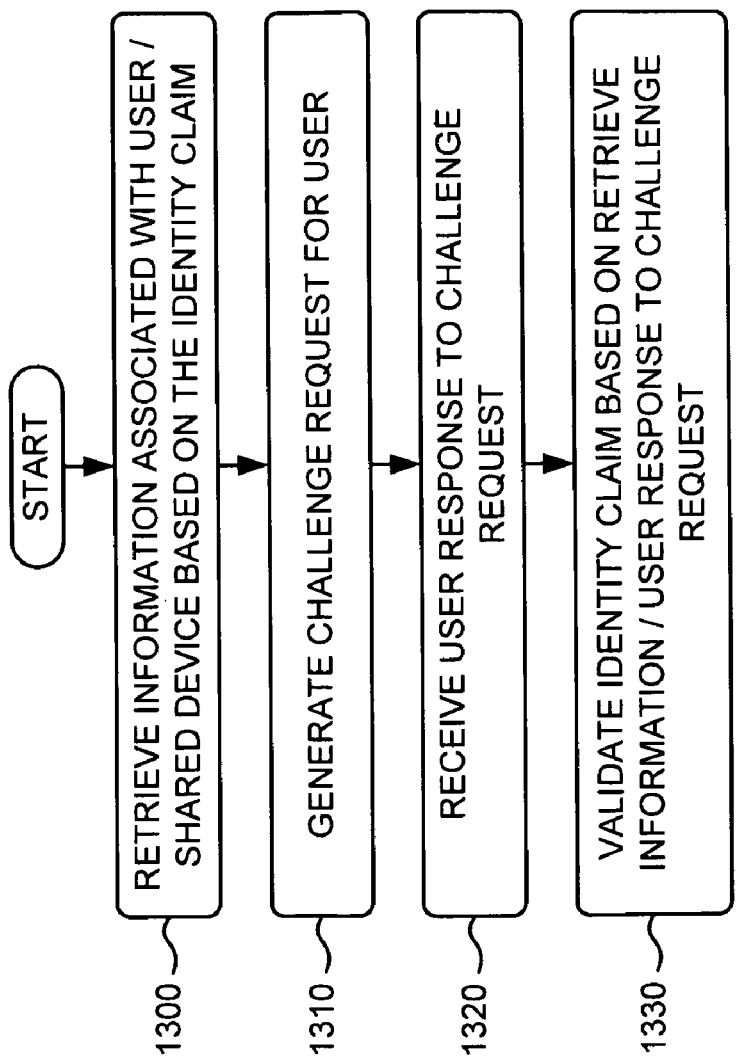

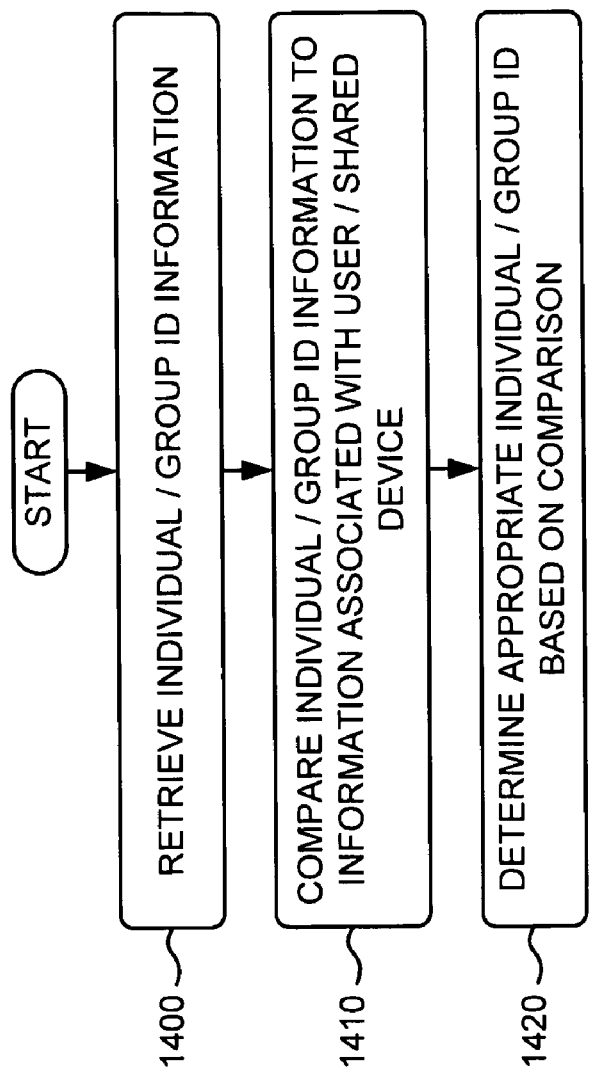

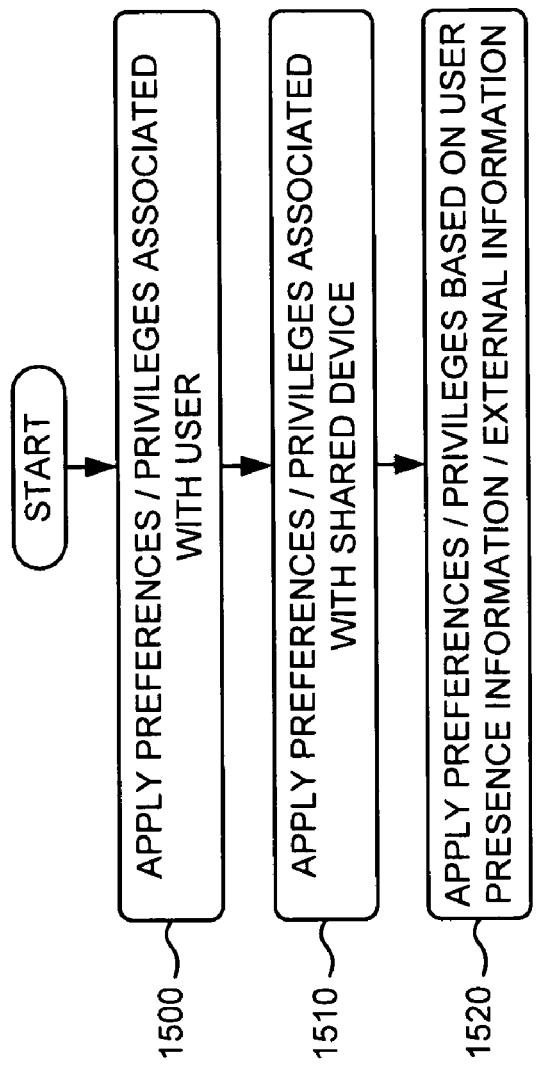

SHARED DEVICE IDENTITY MANAGER

BACKGROUND

Consumers frequently use many different types of electronic devices in their daily lives, such as, televisions, telephones, mobile communications devices (e.g., cell phones), personal digital assistants (PDAs), personal computers, set-top boxes (STBs), portable media devices, etc. As the convergence of communications with entertainment and other devices continues to advance, many of the aforementioned electronic devices may be used by different users or groups of users at different times. For example, a family telephone, a shared personal computer, and a television may be used by different users or groups of users at different times.

BRIEF DESCRIPTION OF THE DRAWINGS

FIGS. 11-15 depict flow charts of an exemplary process for enabling identity management of a shared device according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide a mechanism for managing identities of users of communications-capable shared devices (e.g., televisions, telephones, mobile communications devices, PDAs, personal computers, STBs, portable media devices, etc.). The mechanism may enable users to affiliate or associate their identities (e.g., either automatically or manually) with communications-capable devices that may be shared by multiple and different users. In one implementation, for example, the systems and/or methods may receive an identity claim associated with a user of a shared device, and may validate the identity claim. The systems and/or methods may determine an appropriate individual and/or group identification to affiliate with the shared device, and may apply appropriate shared device preferences and/or privileges based on the determined individual and/or group identification.

A "shared device," as the term is used herein, is to be broadly construed to include, for example, a device (e.g., a television, a telephone, a mobile communications device (e.g., a cell phone), a mobile Internet device (MID), a PDA, a personal computer, a STB, a portable media device, a laptop computer, and/or other types of computation or communication devices) that may be shared by multiple and different users.

As used herein, the terms "viewer" and/or "user" may be used interchangeably. Also, the terms "viewer" and/or "user" are intended to be broadly interpreted to include a television, a STB, a computer device, a hub telephone, and/or a user device or a user of a television, a STB, a computer device, a hub telephone, and/or a user device.

Figure 1:
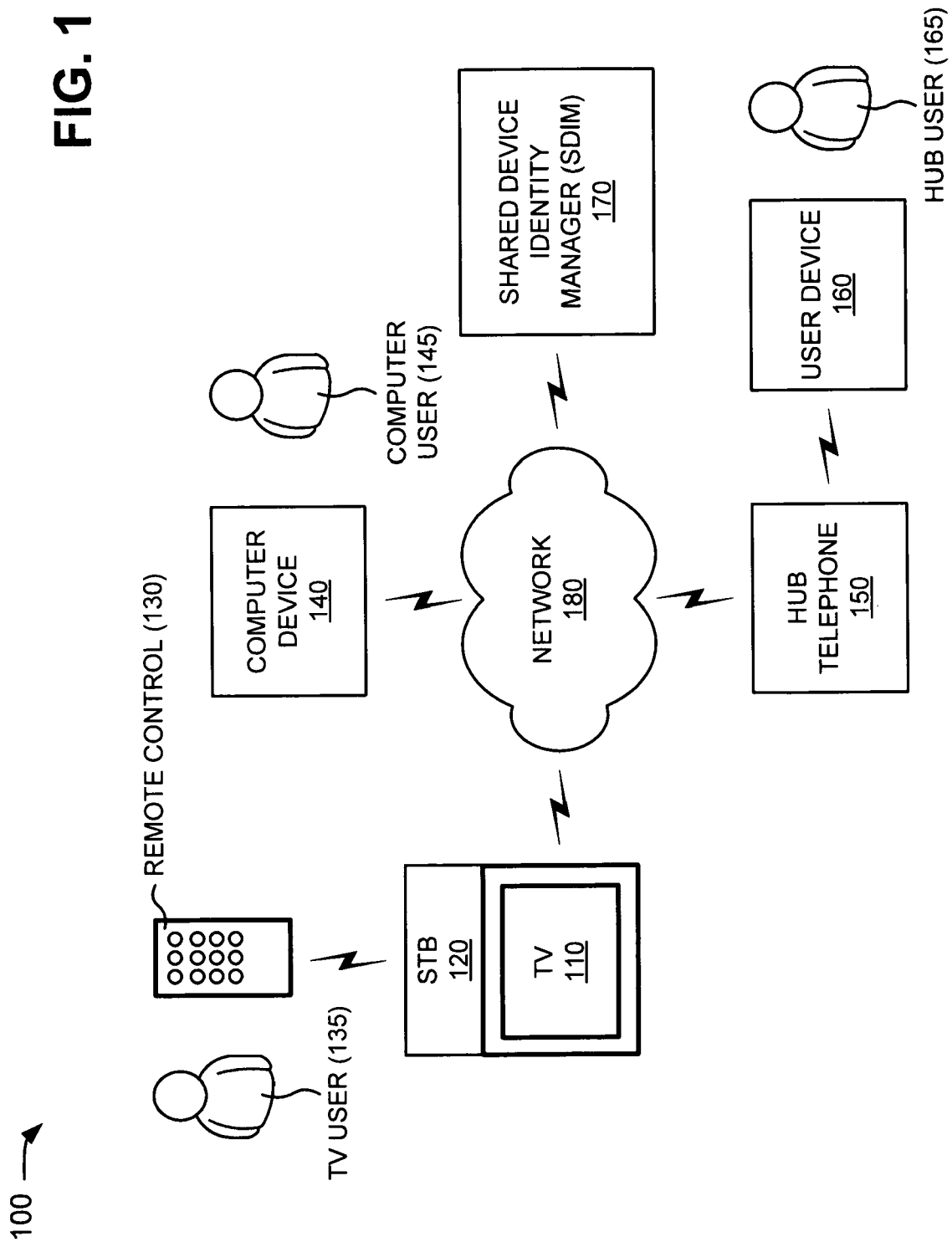
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include a television (TV) 110, a STB 120, a remote control 130 (e.g., associated with a TV user 135), a computer device 140 (e.g., associated with a computer user 145), a hub telephone 150, a user device 160 (e.g., associated with a hub user 165), and a shared device identity manager (SDIM) 170 interconnected by a network 180. Components of network 100 may interconnect via wired and/or wireless connections. A single television 110, STB 120, remote control 130, computer device 140, hub telephone 150, user device 160, SDIM 170, and network 180 have been illustrated in FIG. 1 for simplicity. In practice, there may be more televisions 110, STBs 120, remote controls 130, computer devices 140, hub telephones 150, user devices 160, SDIMs 170, and/or networks 180. Also, in some instances, one or more of the components of network 100 may perform one or more functions described as being performed by another one or more of the components of network 100. Furthermore, STB 120, computer device 140, and hub telephone 150 may be considered shared devices.

Television 110 may include a television monitor that is capable of displaying television programming, content provided by STB 120, Internet content, and/or content provided by other devices (e.g., a digital video disk (DVD) player, a video camera, a broadband home router, etc., not shown) connected to television 110.

STB 120 may include a device that receives television programming (e.g., from a television content provider), and provides the television programming to television 110 or another device. STB 120 may allow a user (e.g., TV user 135) to alter the programming provided to television 110 based on a signal (e.g., a channel up or channel down signal) from remote control 130. STB 120 may record video in a digital format to a disk drive or other memory medium within STB 120. In one exemplary implementation, STB 120 may be incorporated directly within television 110 and/or may include a digital video recorder (DVR).

Remote control 130 may include a device that allows a user (e.g., TV user 135) to control programming and/or content displayed on television 110 via interaction with television and/or STB 120.

Computer device 140 may include a laptop computer, a personal computer, or other types of computation or communication devices, threads or processes running on these devices, and/or objects executable by these devices. In one implementation, computer device 140 may include any device (e.g., an Internet Protocol (IP)-based device) that enables a user (e.g., computer user 145) to access the Internet and/or SDIM 170 via network 180.

Hub telephone 150 may include an all-in-one home communication device (e.g., a telephone) that provides a user (e.g., hub user 165) access to unlimited local and long distance calling and other calling features (e.g., call forwarding, do not disturb and simultaneous ring, etc.). Hub telephone 150 may also enable hub user 165 to access the Internet and/or SDIM 170 via network 180 (e.g., to obtain entertainment, traffic, and weather information), to manage calendars and send notifications to user device 160, access directories to search for businesses and people, etc. In one implementation, hub telephone 150 may communicate with one or more user devices 160.

User device 160 may include a radiotelephone, a personal communications system (PCS) terminal (e.g., that may combine a cellular radiotelephone with data processing and data communications capabilities), a MID, a PDA (e.g., that can include a radiotelephone, a pager, Internet/intranet access, etc.), a laptop computer, a personal computer, or other types of computation or communication devices, threads or processes running on these devices, and/or objects executable by these devices. In one implementation, user device 150 may include any device (e.g., an Internet Protocol (IP)-based device) that enables a user (e.g., hub user 165) to access the Internet and/or SDIM 170 via network 180.

SDIM 170 may include one or more server entities, or other types of computation or communication devices, that gather, process, search, and/or provide information in a manner described herein. In one implementation, SDIM 170 may receive an identity claim (e.g., identification information, such a user name, a password, etc.) associated with a user (e.g., one or more of users 135, 145, and/or 165) of a shared device (e.g., one or more of STB 120, computer device 140, and/or hub telephone 150), and may validate the identity claim. SDIM 170 may determine an appropriate individual and/or group identification to affiliate or associate with the shared device, and may apply appropriate shared device preferences and/or privileges (e.g., television viewing preferences, address books, calendars, etc.) based on the determined individual and/or group identification. In some implementations, the functionality of SDIM 170 may be integrated as part of another device, such as part of computer device 140.

Network 180 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks.

Figure 2:
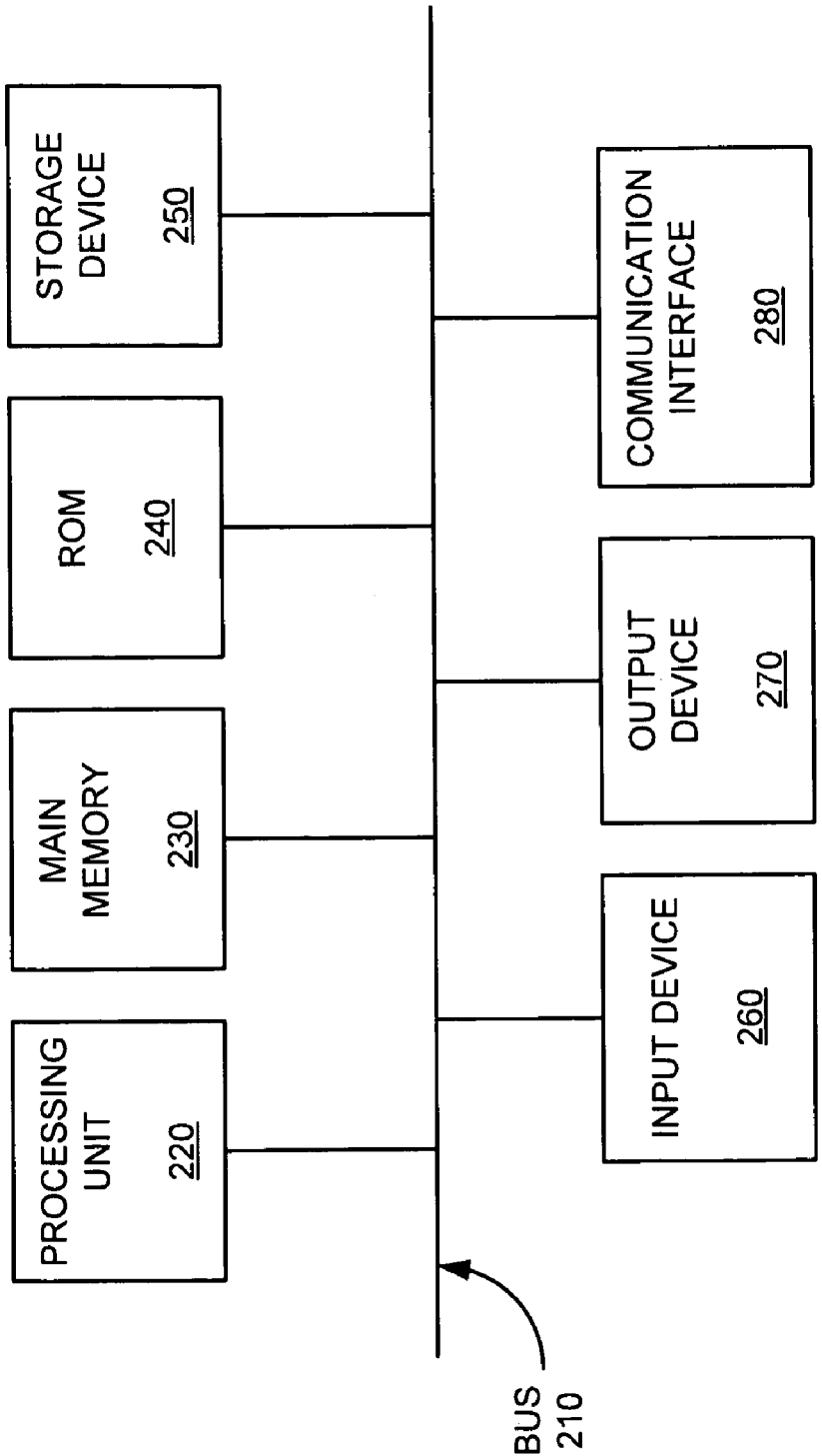
FIG. 2 illustrates a diagram of exemplary components of a set-top box (STB), a computer device, and/or a shared device identity manager (SDIM) of the network depicted in FIG. 1.

FIG. 2 is an exemplary diagram of a device 200 that may correspond to, for example, any of STB 120, computer device 140, and/or SDIM 170. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic, flash, and/or optical recording medium and its corresponding drive.

Input device 260 may include a mechanism that permits an operator to input information to device 200, such as a keyboard, a touch screen, a mouse, a pen, a microphone, voice recognition, a camera, a video camera, and/or biometric mechanisms, remote control 130, etc. Output device 270 may include a mechanism that outputs information to the operator, including a display, a printer, a speaker, a haptic (or tactile) interface, etc. Communication interface 280 may include any transceiver-like mechanism that enables device 200 to communicate with other devices and/or systems. For example, communication interface 280 may include mechanisms for communicating with another device or system via a network, such as network 180.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
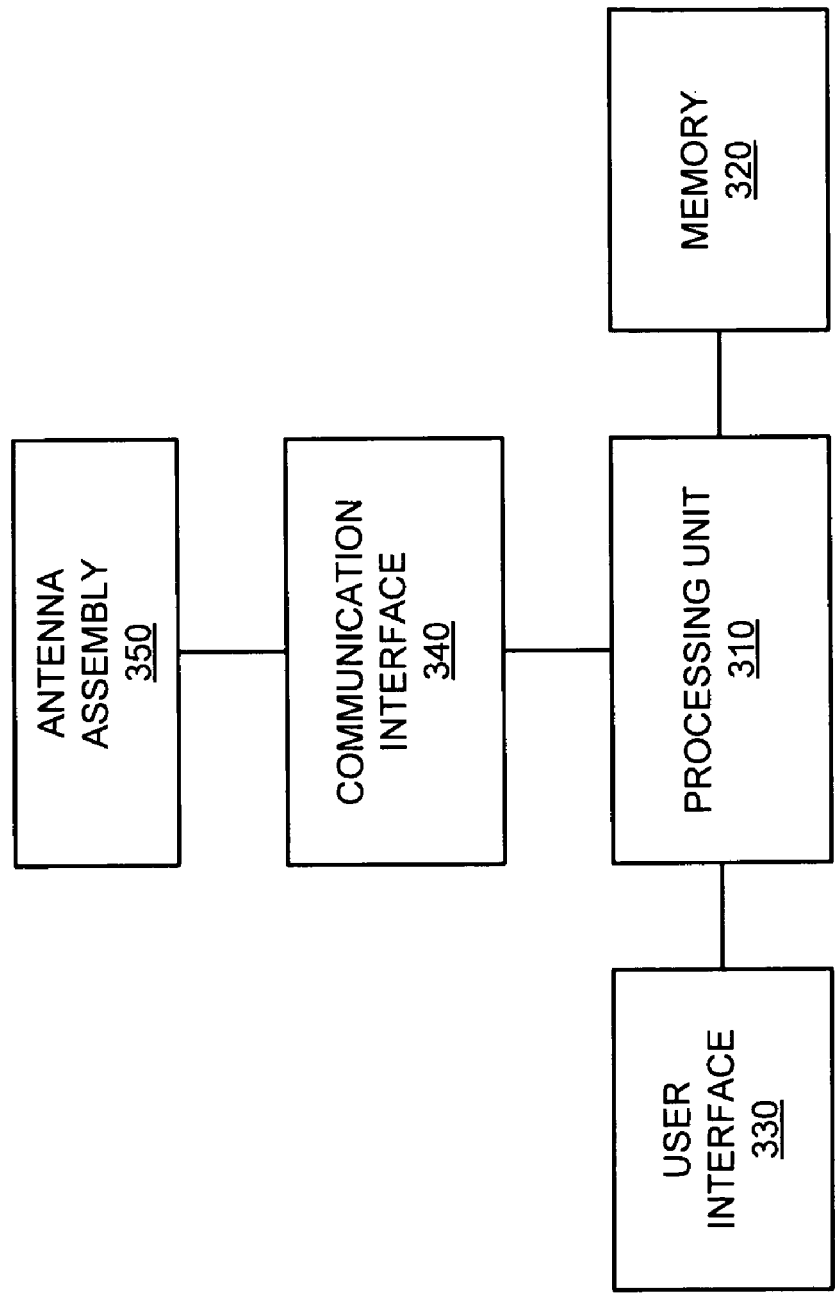
FIG. 3 depicts a diagram of exemplary components of a hub telephone and/or a user device of the network illustrated in FIG. 1.

FIG. 3 depicts a diagram of exemplary components of a device 300 that may correspond to, for example, hub telephone 150 and/or user device 160. As illustrated, device 300 may include a processing unit 310, memory 320, a user interface 330, a communication interface 340, and/or an antenna assembly 350.

Processing unit 310 may include one or more processors, microprocessors, application specific integrated circuits (ASICs), field programmable gate arrays (FPGAs), or the like. Processing unit 310 may control operation of device 300 and its components. In one implementation, processing unit 310 may control operation of components of device 300 in a manner described herein.

Memory 320 may include a random access memory (RAM), a read-only memory (ROM), and/or another type of memory to store data and instructions that may be used by processing unit 310.

User interface 330 may include mechanisms for inputting information to device 300 and/or for outputting information from device 300. Examples of input and output mechanisms might include buttons (e.g., control buttons, keys of a keypad, a joystick, a camera, a video camera, etc.) or a touch screen interface to permit data and control commands to be input into device 300; a speaker to receive electrical signals and output audio signals; a microphone to receive audio signals and output electrical signals; a display to output visual information (e.g., text input into device 300); and/or a vibrator to cause device 300 to vibrate.

Communication interface 340 may include, for example, a transmitter that may convert baseband signals from processing unit 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and/or reception of the RF signals.

Antenna assembly 350 may include one or more antennas to transmit and/or receive RF signals over the air. Antenna assembly 350 may, for example, receive RF signals from communication interface 340 and transmit them over the air, and receive RF signals over the air and provide them to communication interface 340. In one implementation, for example, communication interface 340 may communicate with a network and/or devices connected to a network (e.g., network 180).

As will be described in detail below, device 300 may perform certain operations described herein in response to processing unit 310 executing software instructions of an application contained in a computer-readable medium, such as memory 320. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently arranged, or additional components than depicted in FIG. 3. In still other implementations, one or more components of device 300 may perform one or more other tasks described as being performed by one or more other components of device 300.

Figure 4:
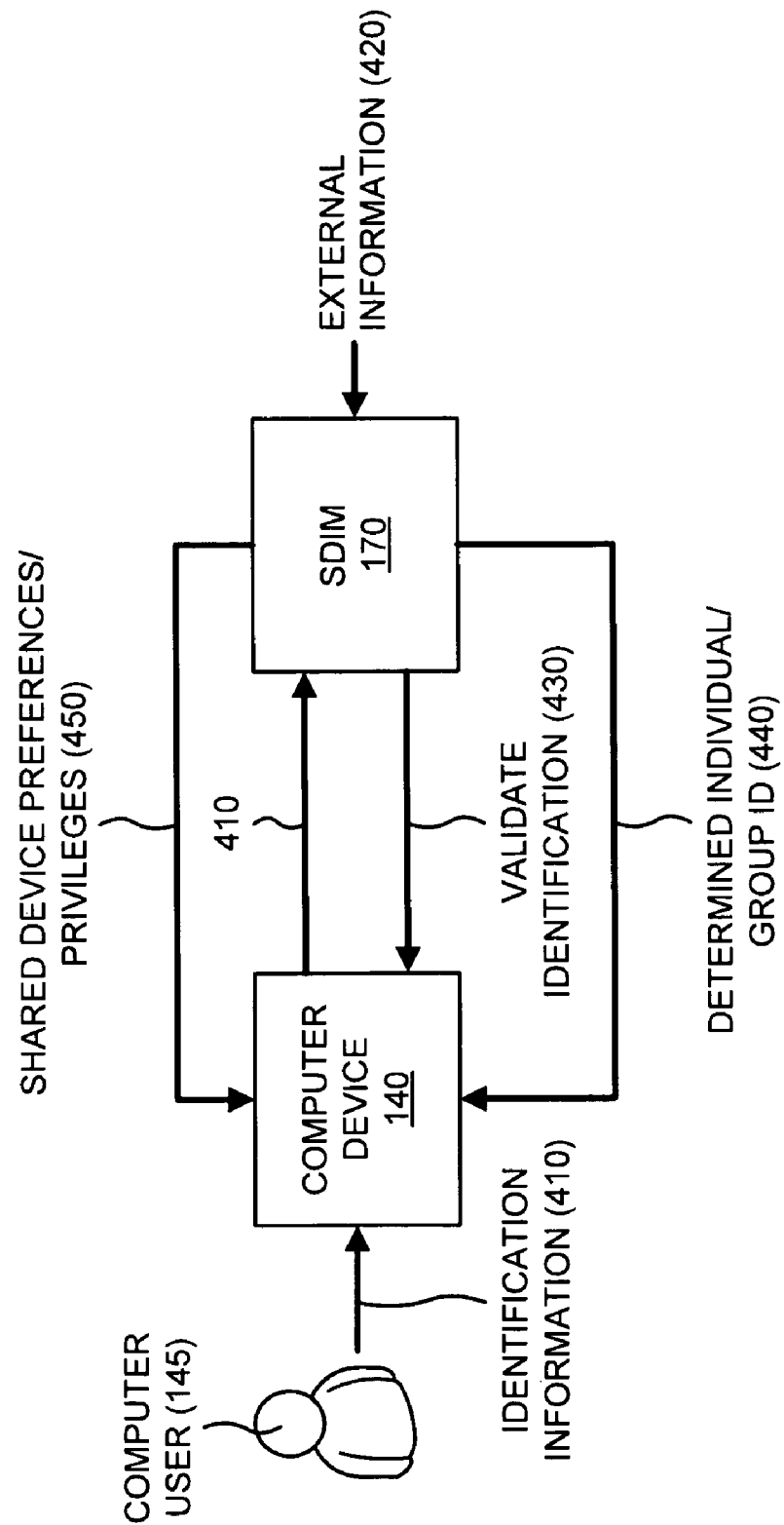
FIG. 4 illustrates a diagram of an exemplary portion of the network depicted in FIG. 1, and further illustrates shared device identity management by the SDIM.

FIG. 4 illustrates a diagram of an exemplary portion 400 of network 100. As illustrated, exemplary network portion 400 may include computer device 140 and SDIM 170. Computer device 140 and SDIM 170 may include the features described above in connection with, for example, FIG. 1.

As further shown in FIG. 4, computer user 145 may provide identification information 410 to SDIM 170 via computer device 140. SDIM 170 may also receive external information 420. Identification information 410 may include an identity claim for computer user 145, such as a private user identifier (e.g., an account number, a user name and/or password, etc.), user contact information (e.g., address, telephone number, email address, etc.), a shared device identifier (e.g., an Internet protocol (IP) address associated with computer device 140, a device name associated with computer device 140, etc.), etc. Identification information 410 may also include one or more public user identifiers. For example, if computer user 145 is working from home and is affiliated with computer device 140 (e.g., which acts as his work computer during work hours (e.g., 9 AM to 5 PM)), identification information 410 may include a public user identifier (e.g., "User@Work") that is associated with computer device 140 during work hours. After 5 PM, when computer user 145 is no longer working, computer user 145 (e.g., via identification information 410) may change the public user identifier (e.g., to "User@Home") that is associated with computer device 140.

Identification information 410 may also include presence information (e.g., whether computer user 145 is actively using computer device 140, as determined by whether computer device 140 has been idle for a predetermined amount of time), location information (e.g., location of computer device 140, location of computer user 145, etc.), and other network knowledge information (e.g., computer user 145 historical information, account information, etc.). Presence (or status) information (e.g., "Paul@Work" and presence status "Available") may be based on IP Multimedia Subsystem (IMS) standards so that SDIM 170 may enable users to have multiple public user identities as defined by IMS standards (e.g., "Paul@Work," "Paul@Home," "Paul@School," etc.).

In one implementation, computer user 145 may provide identification information 410 to computer device 140 automatically or manually. For example, if computer user 145 possesses a mobile communication device (e.g., a cell phone, a PDA, etc.) and computer device 140 includes a wireless communication interface, computer device 140 may detect (e.g., via Bluetooth™, near-field, etc. protocols) the mobile communication device when computer user 145 is within a certain distance from computer device 140. Computer device 140 may identify computer user 145 based on the detected mobile communication device, and may automatically provide identification information 410 to SDIM 170. SDIM 170 may automatically provide identification information 410 to computer device 140 by communicating location proximity (e.g., as determined by a Global Positioning System (GPS) and/or cell tower triangulation) of computer user 145 to computer device 140, via network 180. Alternatively, computer user 145 may manually input identification information 410 (e.g., via a voice command, a keyboard, a keypad, etc.) to computer device 140, and computer device 140 may provide identification information 410 to SDIM 170.

External information 420 may include timing information associated with when computer user 145 provides identification information 410 to SDIM 170. For example, the timing information may include a month, a day of the week, a time of day, etc. when computer user 145 provides identification information 410 to SDIM 170. External information 420 may also include such timing information regardless of when computer user 145 provides identification information 410 to SDIM 170. For example, using the scenario described above, SDIM 170 may use the time of day information to determine a public user identifier (e.g., "User@Work" or "User@Home") for computer user 145. If external information 420 indicates that it is after 5 PM, SDIM 170 may automatically change the public user identifier (e.g., to "User@Home") that is associated with computer device 140.

SDIM 170 may use identification information 410 and/or external information 420 to validate the identity claim for computer user 145. In one implementation, SDIM 170 may compare identification information 410 to information retrieved from and maintained in a database associated with SDIM 170 in order to assist in validating the identity claim for computer user 145. The database information may include user history associated with a shared device (e.g., computer device 140), preferences associated with the shared device, approved users of the shared device, preferences (e.g., bookmarks, calendars, contact lists, address books, etc.) and privileges (e.g., access rights to content provided by SDIM 170 or another content provider, parental filters, etc.) associated with the approved users of the shared device, locations of shared devices, etc. SDIM 170 may challenge computer user's 145 identity claim by requesting a password, requesting a biometric (e.g., such as speaking a challenge phrase, utilizing voice recognition, utilizing facial recognition, requesting a finger print, etc.), etc. If SDIM 170 validates the identity claim for computer user 145 and the shared device (e.g., computer device 140), SDIM 170 may provide, to computer device 140, an indication 430 that the identity claim has been validated.

If the identity claim of computer user 145 is validated, SDIM 170 may determine an appropriate individual and/or group identification (ID) 440 to affiliate with the shared device (e.g., computer device 140). If computer user 145 is associated with an individual ID (e.g., an ID associated with a parent using a home computer for work), SDIM 170 may associate the individual ID with computer device 140 so that computer device 140 enables the parent to access information pertinent to his/her work (e.g., a server at work, work calendars, work contacts, work address books, work email accounts, etc.) as well as other information (e.g., the Internet, favorite web sites, bookmarks, etc.), etc. If computer user 145 is associated with a group ID (e.g., an ID associated with a family using a home computer), SDIM 170 may associate the group ID with computer device 140 so that computer device 140 enables the family (or family member) to access family-related content (e.g., favorite family web sites, prevention of access to adult content or certain web sites, etc.).

SDIM 170 may apply appropriate shared device preferences and/or privileges 450 to computer device 140 based on determined individual and/or group ID 440. For example, a shared device (e.g., STB 120, computer device 140, hub telephone 150, etc.) may include software (e.g., a privilege/preference software) that may be activated by SDIM 170 (e.g., via a command provided to the shared device). Shared device preferences/privileges 450 may include preferences associated with the shared device (e.g., STB 120, computer device 140, hub telephone 150, etc.), preferences (e.g., bookmarks, calendars, contact lists, address books, favorite channels, etc.) and privileges (e.g., access rights to content provided by SDIM 170 or another content provider, parental filters, etc.) associated with approved users (e.g., TV user 135, computer user 145, hub user 165, etc.) of the shared device, etc. For example, if computer user 145 is a young child, SDIM 170 may apply shared device preferences and/or privileges 450 that prevent the child from accessing inappropriate content on the Internet. If computer user 145 is an adult, SDIM 170 may apply shared device preferences and/or privileges 450 that enable the adult to access all content on the Internet.

If identifications of multiple users are associated with a shared device (e.g., computer device 140), SDIM 170 may prioritize the identifications. For example, if a child is affiliated with and is using computer device 140, SDIM 170 may apply, to computer device 140, shared device preferences/privileges 450 associated with the child. If the child's mother comes home, SDIM 170 may associate the mother with computer device 140 and may update shared device preferences/privileges 450 so that the mother's shared device preferences/privileges 450 are applied to computer device 140 (e.g., and take priority over the child's preferences/privileges).

Such an arrangement, as depicted in FIG. 4, may enable network-based identity management of shared devices, and may provide enforcement of personalized, validated shared device preferences and/or privileges. The arrangement also enables acceptance of identity claims that originate from users via heterogeneous mechanisms (e.g., near-field, Bluetooth™, radio frequency identification (RFID), keyboard input, speech recognition, etc.). The arrangement enables users and/or groups of users to personalize identity, communications, and shared device preferences, and utilizes user presence, location, and other information for identity, preferences, and privilege decisions. The arrangement further enables use of external sources (e.g., external information 420) when making identity decisions, supports group identities and identity priorities, and supports multiple public user identities on shared devices.

Although FIG. 4 shows exemplary components of network portion 400, in other implementations, network portion 400 may contain fewer, different, differently arranged, or additional components than depicted in FIG. 4. In still other implementations, one or more components of network portion 400 may perform one or more other tasks described as being performed by one or more other components of network portion 400.

Figure 5:
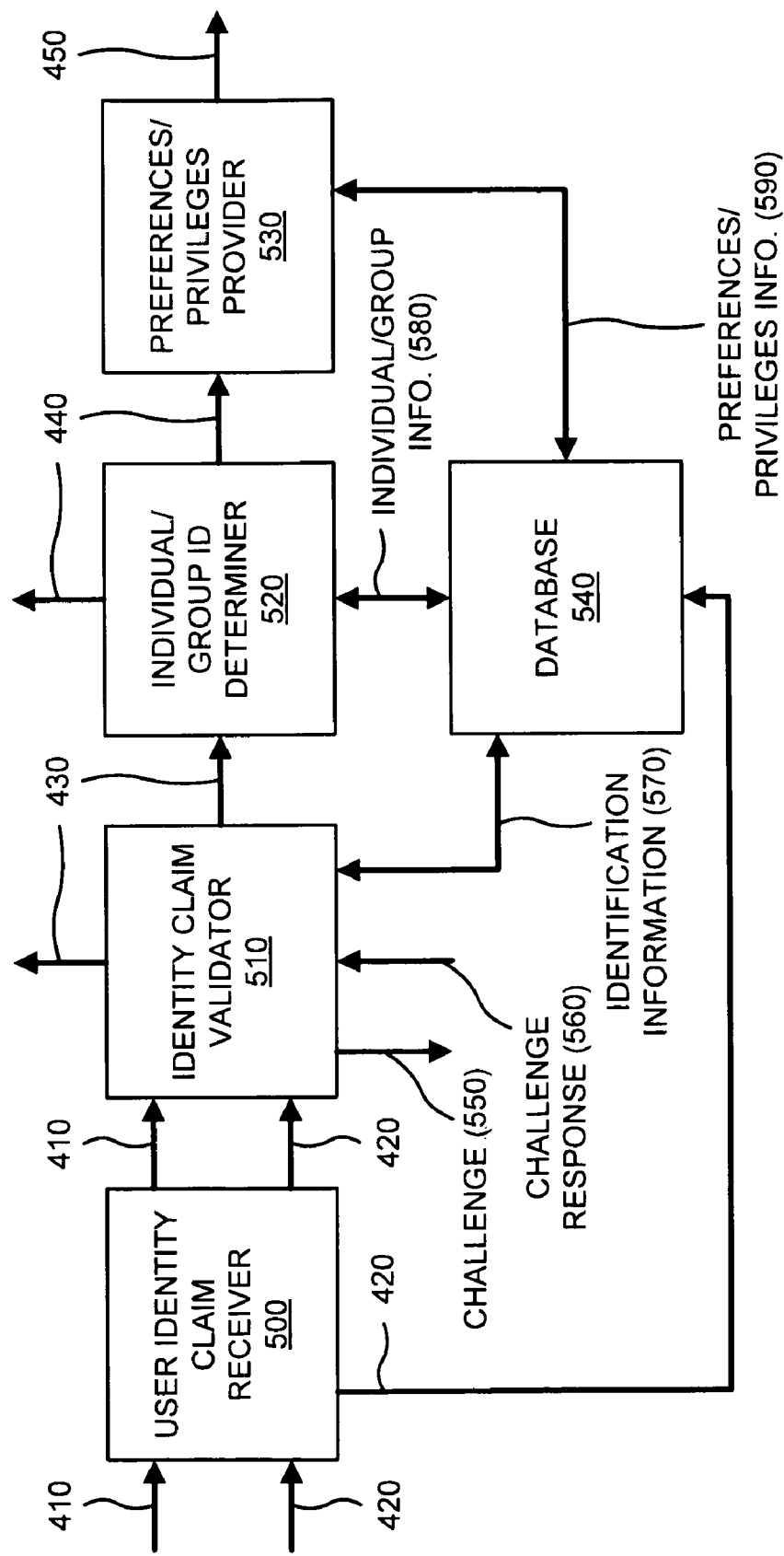
FIG. 5 depicts a diagram of exemplary functional components of the SDIM of the network illustrated in FIG. 1.

FIG. 5 depicts a diagram of exemplary functional components of SDIM 170. As illustrated, SDIM 170 may include a user identity claim receiver 500, an identity claim validator 510, an individual/group ID determiner 520, a privileges/preferences provider 530, and a database 540. The functions described in FIG. 5 may be performed by one or more of the exemplary components of device 200 depicted in FIG. 2.

User identity claim receiver 500 may include any hardware, software, or combination of hardware and software that may receive an identity claim for a shared device (e.g., via identification information 410) and external information 420, and may provide identification information 410 and external information 420 to identity claim validator 510. User identity claim receiver 500 may provide external information 420 to database 540.

Identity claim validator 510 may include any hardware, software, or combination of hardware and software that may receive identification information 410 and external information 420 from user identity claim receiver 500, and may use identification information 410 and/or external information 420 to validate the identity claim for a shared device. Identity claim validator 510 may compare identification information 410 to identification information 570 maintained in database 540 in order to assist in validating the identity claim. Identification information 570 may include user identifiers (e.g., account numbers, user names and/or passwords, etc.), user contact information (e.g., addresses, telephone numbers, email addresses, etc.), device identifiers (e.g., IP addresses, device names, media access control (MAC) addresses, etc.), etc. of users and/or shared devices associated with SDIM 170. Identity claim validator 510 may challenge the identity claim by issuing a challenge 550 (e.g., requesting a password, requesting a biometric, etc.) to the shared device. The shared device may provide a challenge response 560 to identity claim validator 510, and identity claim validator 510 may validate the identity claim based on challenge response 560. In other implementations, identity claim validator 510 may validate the identity claim based on the comparison of identification information 410 to other information maintained in database 540. If identity claim validator 510 validates the identity claim for the shared device, identity claim validator 510 may generate indication 430 that the identity claim has been validated. Identity claim validator 510 may provide indication 430 to the shared device and to individual/group ID determiner 520.

Individual/group ID determiner 520 may include any hardware, software, or combination of hardware and software that may receive indication 430 from identity claim validator 510, and may receive individual/group information 580 from database 540. Individual/group information 580 may include individual identification information (e.g., names, approved shared devices, historical information, etc. associated with individuals) and group identification information (e.g., group names, approved shared devices, etc. associated with groups). Individual/group ID determiner 520 may compare individual/group information 580 with identification information 410 to determine appropriate individual/group ID 440 to affiliate with the shared device. Individual/group ID determiner 520 may provide individual/group ID 440 to the shared device and to preferences/privileges provider 530.

Preferences/privileges provider 530 may include any hardware, software, or combination of hardware and software that may receive individual/group ID 440 from individual/group ID determiner 520, and may receive preferences/privileges information 590 from database 540. Preferences/privileges information 590 may include preferences (e.g., bookmarks, calendars, contact lists, address books, etc.) and privileges (e.g., access rights to content provided by SDIM 170 or another content provider, parental filters, etc.) associated with the shared device and/or associated with approved users of the shared device. Preferences/privileges provider 530 may apply appropriate shared device preferences and/or privileges 450 (e.g., selected from preferences/privileges information 590) to the shared device based on determined individual and/or group ID 440. Preferences/privileges provider 530 may provide shared device preferences and/or privileges 450 to the shared device.

Database 540 may include a storage device (e.g., main memory 230, ROM 240, storage device 250, etc.) that may store information received by SDIM 170. In one implementation, database 540 may store information, such as external information 420, identification information 570, individual/group information 580, and preference/privileges information 590. Database 540 may be incorporated within SDIM 170, as shown in FIG. 5. Alternatively, database 540 may be separate from SDIM 170 and may communicate with SDIM 170 (e.g., via communication interface 280).

Although FIG. 5 shows exemplary functional components of SDIM 170, in other implementations, SDIM 170 may contain fewer, different, differently arranged, or additional functional components than depicted in FIG. 5. In still other implementations, one or more functional components of SDIM 170 may perform one or more other tasks described as being performed by one or more other functional components of SDIM 170.

Figure 6:
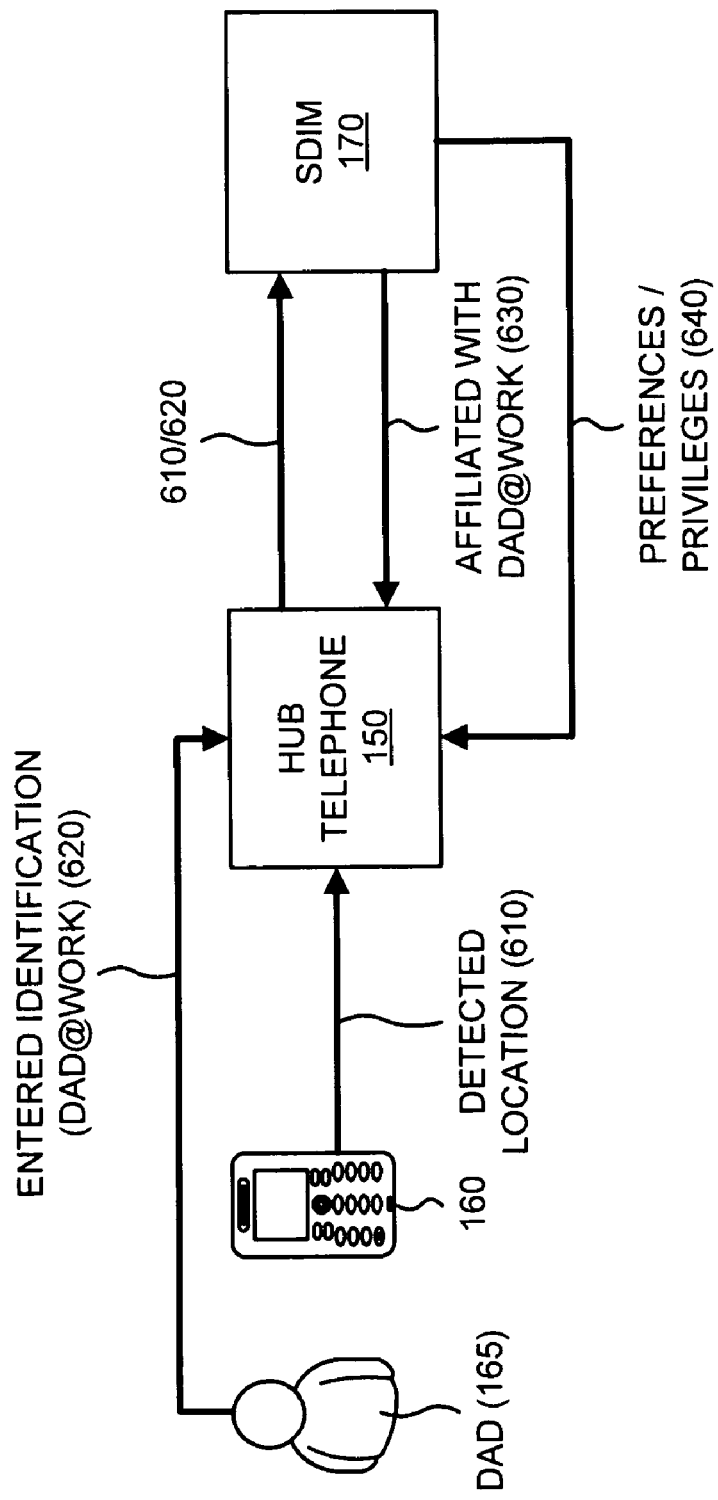
FIG. 6 illustrates a diagram of another exemplary portion of the network depicted in FIG. 1, and further illustrates an exemplary implementation where the hub telephone is affiliated with a father working from home.

FIG. 6 illustrates a diagram of another exemplary portion 600 of network 100. As shown, exemplary network portion 600 may include hub telephone 150, user device 160 (e.g., a cell phone or PDA), and SDIM 170. Hub telephone 150, user device 160, and SDIM 170 may include the features described above in connection with, for example, FIG. 1.

As further shown in FIG. 6, a father (e.g., hub user 165) may be associated with user device 160. For example, user device 160 may be a cell phone carried by father 165. As father 165 approaches hub telephone 150, a location 610 of user device 160 (and father 165) may be detected by hub telephone 150. In one implementation, hub telephone 150 may detect (e.g., via Bluetooth™, near-field, etc. protocols) user device 160 when father 165 is within a certain distance from hub telephone 150. Hub telephone 150 may identify father 165 based on the detected user device 160, and may automatically provide detected location 610 (e.g., identifying father 165) to SDIM 170. SDIM 170 may use GPS and/or cell tower triangulation location information for user device 160 to automatically affiliate father 165 with hub telephone 150. Alternatively, father 165 may manually enter identification information 620 (e.g., via a voice command, a keyboard, a keypad, etc.) to hub telephone 150, and hub telephone 150 may provide entered identification 620 to SDIM 170. Entered identification 620 may include information indicating, for example, that father 165 is working from home (e.g., "Dad@Work").

SDIM 170 may receive detected location 610 and/or entered identification 620 from hub telephone 150, and may affiliate hub telephone 150 with a user identification (e.g., "Dad@Work"), as indicated by reference number 630. SDIM 170 may provide, to hub telephone 150, preferences and/or privileges 640 associated with the Dad@Work user identification (e.g., a work telephone number), and hub telephone 150 may act as father's 165 work telephone. Preferences and/or privileges 640 may include information similar to the information described above in connection with shared device preferences and/or privileges 450.

Although FIG. 6 shows exemplary components of network portion 600, in other implementations, network portion 600 may contain fewer, different, differently arranged, or additional components than depicted in FIG. 6. In still other implementations, one or more components of network portion 600 may perform one or more other tasks described as being performed by one or more other components of network portion 600.

Figure 7:
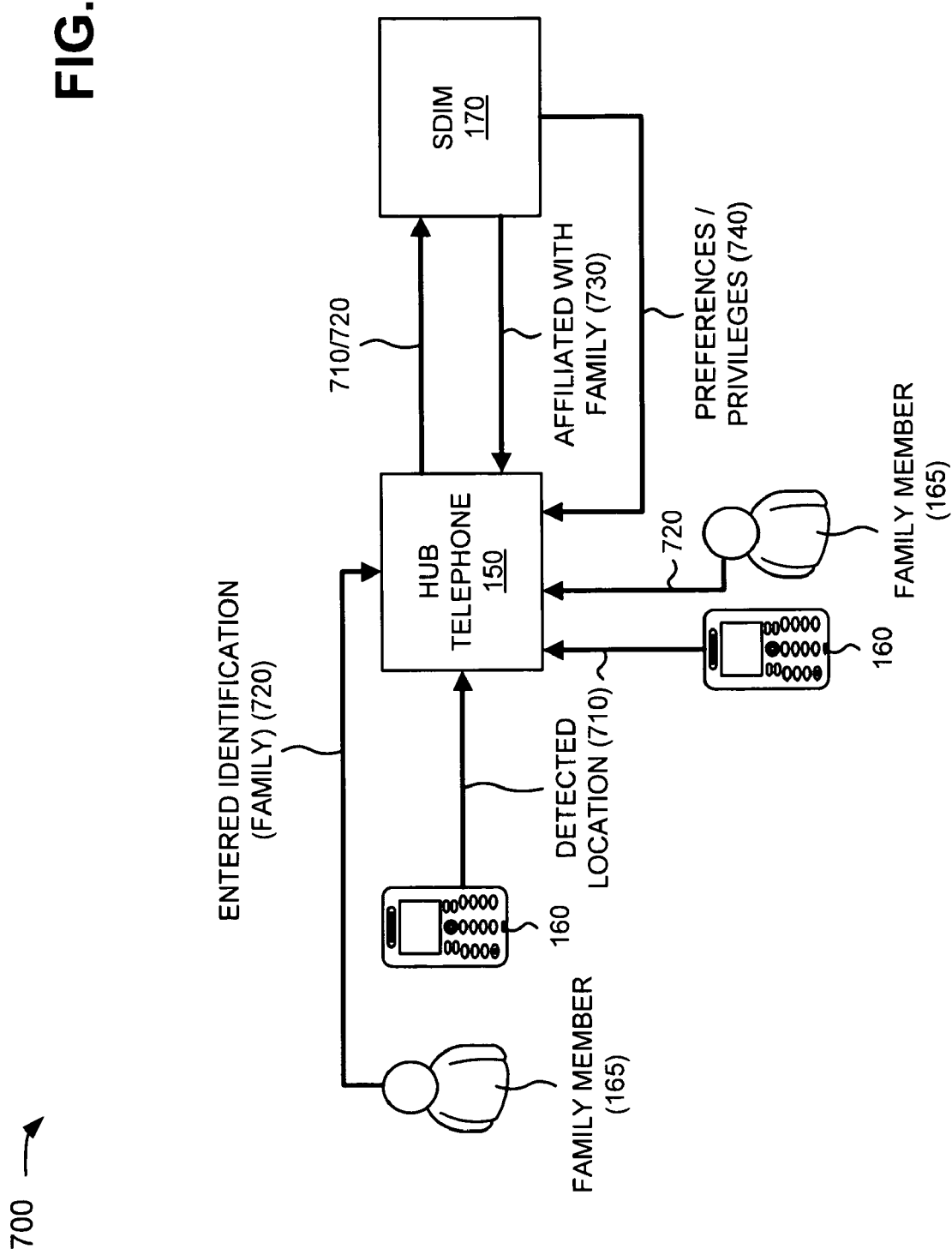
FIG. 7 depicts a diagram of still another exemplary portion of the network illustrated in FIG. 1, and further depicts an exemplary implementation where the hub telephone is affiliated with two family members.

FIG. 7 depicts a diagram of still another exemplary portion 700 of network 100. As shown, exemplary network portion 700 may include hub telephone 150, two user devices 160 (e.g., cell phones or PDAs), and SDIM 170. Hub telephone 150, user devices 160, and SDIM 170 may include the features described above in connection with, for example, FIG. 1.

As further shown in FIG. 7, a first family member (e.g., hub user 165) may be associated with one user device 160, and a second family member 165 may be associated with another user device 160. For example, user devices 160 may be cell phones carried by a husband and wife. As family members 165 approach hub telephone 150, locations 710 of user devices 160 (and family members 165) may be detected by hub telephone 150. In one implementation, hub telephone 150 may detect (e.g., via Bluetooth™, near-field, etc. protocols) user devices 160 when family members 165 are within a certain distance from hub telephone 150. Hub telephone 150 may identify family members 165 based on the detected user devices 160, and may automatically provide detected locations 710 (e.g., identifying family members 165) to SDIM 170. SDIM 170 may use GPS and/or cell tower triangulation location information for user device 160 to automatically affiliate family members 165 with hub telephone 150. Alternatively, one or more of family members 165 may manually enter identification information 720 (e.g., via a voice command, a keyboard, a keypad, etc.) to hub telephone 150, and hub telephone 150 may provide entered identification 720 to SDIM 170. Entered identification 720 may include information indicating, for example, that family members are at home.

SDIM 170 may receive detected location 710 and/or entered identification 720 from hub telephone 150, and may affiliate hub telephone 150 with a user identification (e.g., identifying family members and a family phone number), as indicated by reference number 730. SDIM 170 may provide, to hub telephone 150, preferences and/or privileges 740 associated with the family user identification, and hub telephone 150 may act as a family telephone. Preferences and/or privileges 740 may include information similar to the information described above in connection with shared device preferences and/or privileges 450.

Although FIG. 7 shows exemplary components of network portion 700, in other implementations, network portion 700 may contain fewer, different, differently arranged, or additional components than depicted in FIG. 7. In still other implementations, one or more components of network portion 700 may perform one or more other tasks described as being performed by one or more other components of network portion 700.

Figure 8:
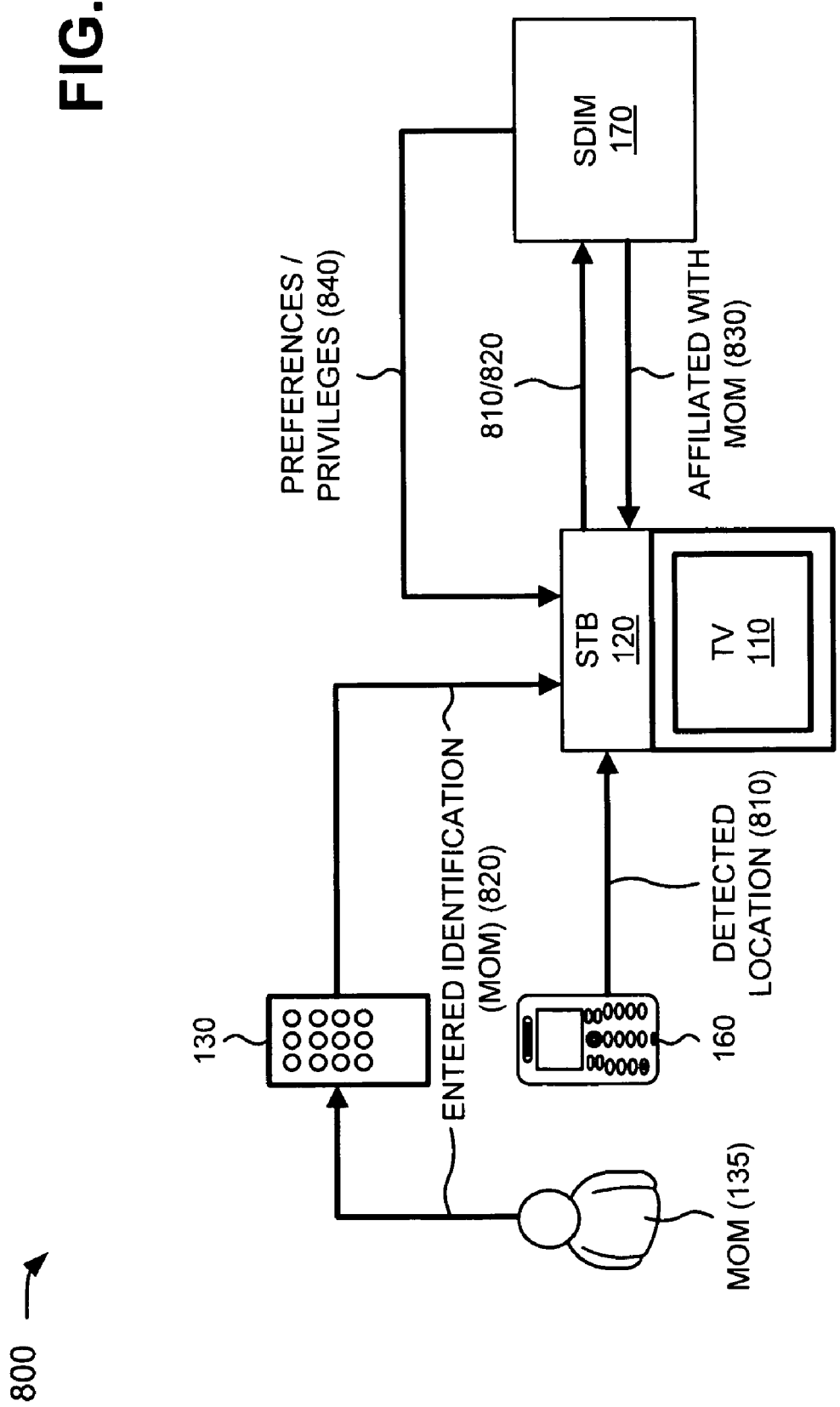
FIG. 8 illustrates a diagram of a further exemplary portion of the network depicted in FIG. 1, and further illustrates an exemplary implementation where the STB is affiliated with a mother watching television.

FIG. 8 illustrates a diagram of a further exemplary portion 800 of network 100. As shown, exemplary network portion 800 may include television 110, STB 120, remote control 130, user device 160 (e.g., a cell phone or PDA), and SDIM 170. Television 110, STB 120, remote control 130, user device 160, and SDIM 170 may include the features described above in connection with, for example, FIG. 1.

As further shown in FIG. 8, a mother (e.g., TV user 135) may be associated with user device 160. For example, user device 160 may be a cell phone carried by mother 135. As mother 135 approaches STB 120, a location 810 of user device 160 (and mother 135) may be detected by STB 120. In one implementation, STB 120 may detect (e.g., via Bluetooth™, near-field, etc. protocols) user device 160 when mother 135 is within a certain distance from STB 120. STB 120 may identify mother 135 based on the detected user device 160, and may automatically provide detected location 810 (e.g., identifying mother 135) to SDIM 170. SDIM 170 may use GPS and/or cell tower triangulation location information for user device 160 to automatically affiliate mother 135 with STB 120. Alternatively, mother 135 may manually enter identification information 820 (e.g., via remote control 130) to STB 120, and STB 120 may provide entered identification 820 to SDIM 170. Entered identification 820 may include information indicating, for example, that only mother 135 is using television 110.

SDIM 170 may receive detected location 810 and/or entered identification 820 from STB 120, and may affiliate STB 120 with a user identification (e.g., identifying mother 135), as indicated by reference number 830. SDIM 170 may provide, to STB 120, preferences and/or privileges 840 associated with mother's 135 user identification, and STB 120 may activate mother's 135 viewing preferences (e.g., favorite channels) and communications preferences. Preferences and/or privileges 840 may include information similar to the information described above in connection with shared device preferences and/or privileges 450.

Although FIG. 8 shows exemplary components of network portion 800, in other implementations, network portion 800 may contain fewer, different, differently arranged, or additional components than depicted in FIG. 8. In still other implementations, one or more components of network portion 800 may perform one or more other tasks described as being performed by one or more other components of network portion 800.

Figure 9:
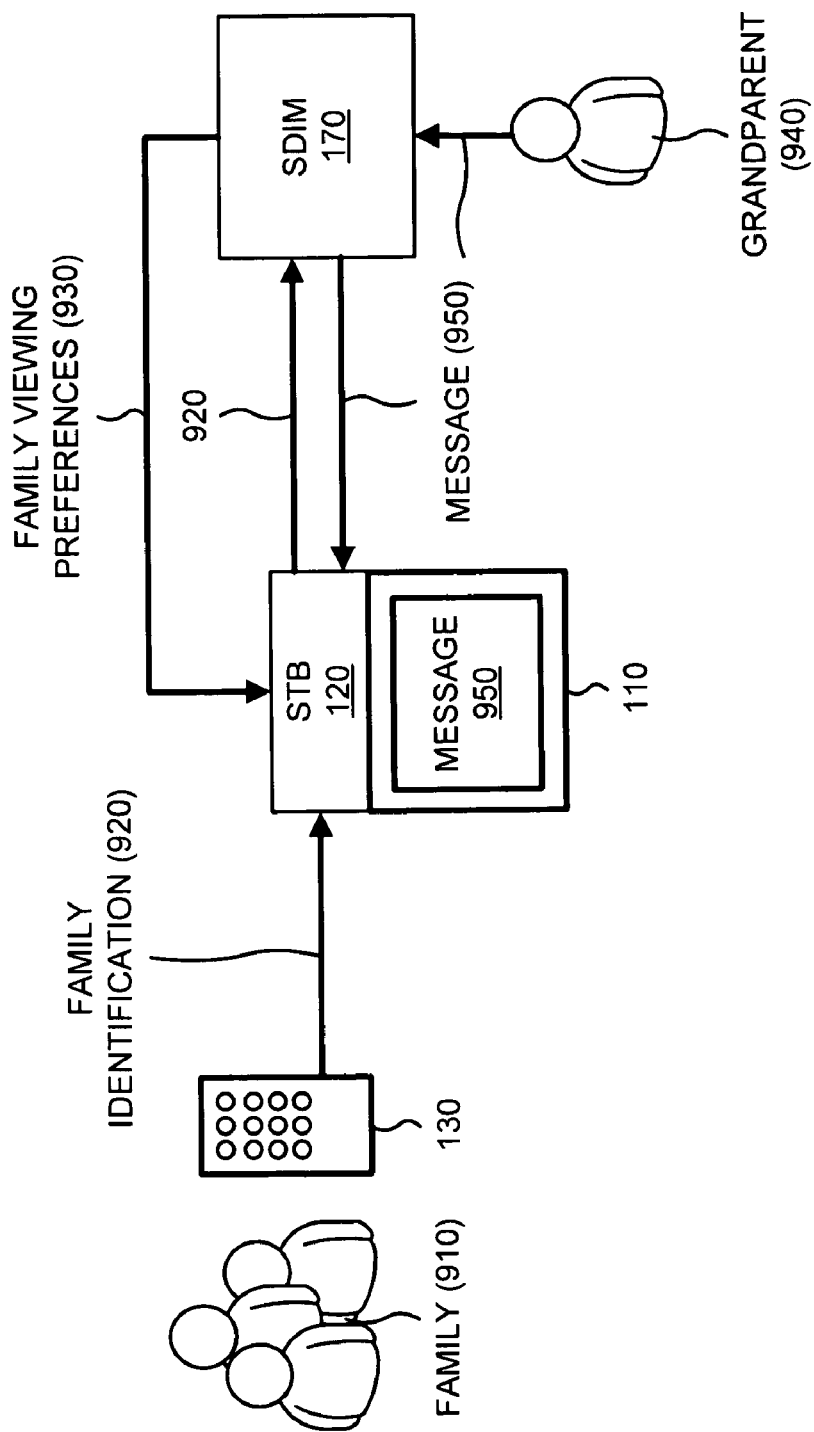
FIG. 9 depicts a diagram of still a further exemplary portion of the network illustrated in FIG. 1, and further depicts an exemplary implementation where the STB is affiliated with a family watching television.

FIG. 9 depicts a diagram of still a further exemplary portion 900 of network 100. As shown, exemplary network portion 900 may include television 110, STB 120, remote control 130, and SDIM 170. Television 110, STB 120, remote control 130, and SDIM 170 may include the features described above in connection with, for example, FIG. 1.

As further shown in FIG. 9, a family 910 (e.g., TV users 135) may manually enter family identification information 920 (e.g., via remote control 130) to STB 120, and STB 120 may provide family identification 920 to SDIM 170. Family identification 920 may include information indicating, for example, that family 910 is using television 110. SDIM 170 may receive family identification 920 from STB 120, and may affiliate STB 120 with a user identification (e.g., identifying family 910). SDIM 170 may provide, to STB 120, family viewing preferences 930 associated with family's 910 user identification, and STB 120 may activate family's 910 viewing preferences (e.g., favorite channels, parental filters, etc.) and communications preferences. Family viewing preferences 930 may include information similar to the information described above in connection with shared device preferences and/or privileges 450.

A grandparent 940 related to family 910 may access SDIM 170 via another device (e.g., a STB, a user device, a computer device, etc.) associated with SDIM 170, and may determine that family 910 is associated with television 110 and STB 120 (e.g., via SDIM 170). Grandparent 940 may want to send family 910 a message 950 (e.g., a "Happy New Year" message) that may be viewed by family on television 110. Grandparent 940 may send message 950 to SDIM 170, and SDIM 170 may forward message 950 to STB 120. STB 120 may provide message 950 to television 110, and television 110 may display message 950 to family 910.

Although FIG. 9 shows exemplary components of network portion 900, in other implementations, network portion 900 may contain fewer, different, differently arranged, or additional components than depicted in FIG. 9. In still other implementations, one or more components of network portion 900 may perform one or more other tasks described as being performed by one or more other components of network portion 900.

Figure 10:
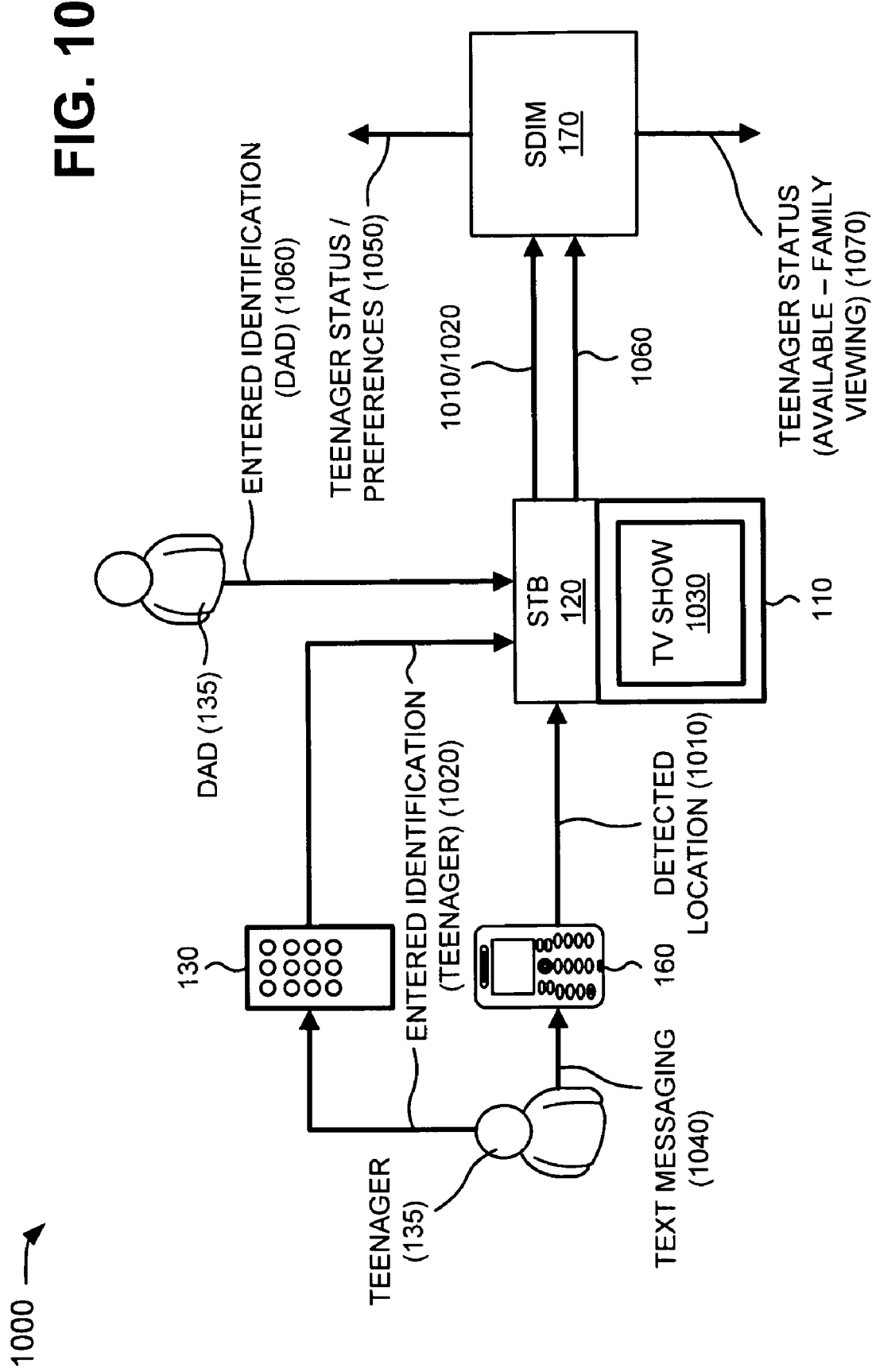
FIG. 10 illustrates a diagram of another exemplary portion of the network depicted in FIG. 1, and further illustrates an exemplary implementation where the STB is affiliated with a teenager and a father watching television.

FIG. 10 illustrates a diagram of another exemplary portion 1000 of network 100. As shown, exemplary network portion 1000 may include television 110, STB 120, remote control 130, user device 160 (e.g., a cell phone or PDA), and SDIM 170. Television 110, STB 120, remote control 130, user device 160, and SDIM 170 may include the features described above in connection with, for example, FIG. 1.

As further shown in FIG. 10, a teenager (e.g., TV user 135) may be associated with user device 160. For example, user device 160 may be a cell phone carried by teenager 135. As teenager 135 approaches STB 120, a location 1010 of user device 160 (and teenager 135) may be detected by STB 120. In one implementation, STB 120 may detect (e.g., via Bluetooth™, near-field, etc. protocols) user device 160 when teenager 135 is within a certain distance from STB 120. STB 120 may identify teenager 135 based on the detected user device 160, and may automatically provide detected location 1010 (e.g., identifying teenager 135) to SDIM 170. SDIM 170 may use GPS and/or cell tower triangulation location information for user device 160 to automatically affiliate teenager 135 with STB 120. Alternatively, teenager 135 may manually enter identification information 1020 (e.g., via remote control 130 or user device 160) to STB 120, and STB 120 may provide entered identification 1020 to SDIM 170. Entered identification 1020 may include information indicating, for example, that only teenager 135 is using television 110. Teenager 135 may be watching a TV show 1030 (e.g., displayed on television 110) and may be text messaging 1040 (e.g., via user device 160) with his/her friends about TV show 1030.

SDIM 170 may receive detected location 1010 and/or entered identification 1020 from STB 120, and may affiliate STB 120 with a user identification (e.g., identifying teenager 135). SDIM 170 may provide status and/or preferences 1050 associated with teenager's 135 user identification to teenager's 135 friends so that the friends can see that teenager 135 is watching TV show 1030 alone. If a father 135 of teenager 135 decides to watch TV show 1030 with teenager 135, father 135 may enter identification information 1060 (e.g., via remote control 130 or user device 160) to STB 120, and STB 120 may provide entered identification 1060 to SDIM 170. Entered identification 1060 may include information indicating, for example, that a family (e.g., father 135 and teenager 135) is using television 110. SDIM 170 may receive entered identification 1060 from STB 120, and may affiliate STB 120 with a user identification (e.g., identifying a family). SDIM 170 may automatically update teenager's 135 television status (e.g., to "Available—Family Viewing") so that teenager's 135 friends can see that teenager 135 is watching TV show 1030 with a parent. Based on teenager's 135 status change, the friends may keep their text messaging to a "family" rating.

Although FIG. 10 shows exemplary components of network portion 1000, in other implementations, network portion 1000 may contain fewer, different, differently arranged, or additional components than depicted in FIG. 10. In still other implementations, one or more components of network portion 1000 may perform one or more other tasks described as being performed by one or more other components of network portion 1000.

FIGS. 11-15 depict flow charts of an exemplary process 1100 for enabling identity management of a shared device according to implementations described herein. In one implementation, process 1100 may be performed by SDIM 170. In another implementation, some or all of process 1100 may be performed by another device or group of devices, including or excluding SDIM 170.

Figure 11:
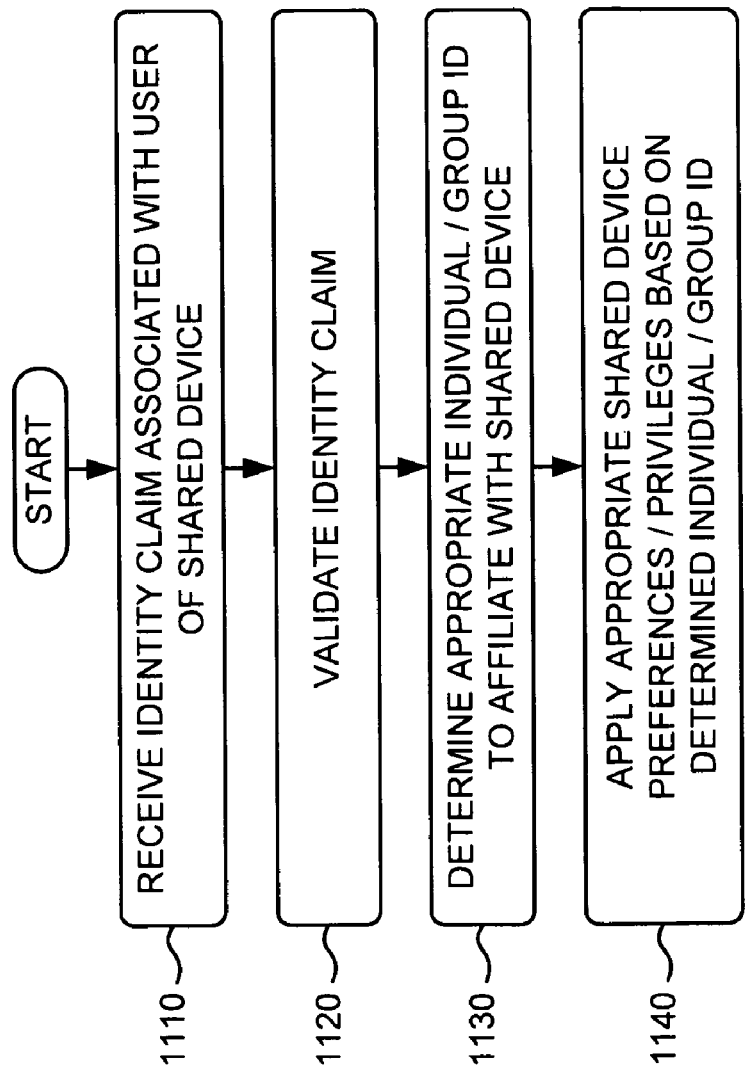

As illustrated in FIG. 11, process 1100 may begin with receipt of an identity claim associated with a user of a shared device (block 1110), and validation of the identity claim (block 1120). For example, in implementations described above in connection with FIG. 4, computer user 145 may provide identification information 410 to SDIM 170 via computer device 140. SDIM 170 may also receive external information 420. Identification information 410 may include an identity claim for computer user 145, such as a user identifier (e.g., an account number, a user name and/or password, etc.), user contact information (e.g., address, telephone number, email address, etc.), a shared device identifier (e.g., an Internet protocol (IP) address associated with computer device 140, a device name associated with computer device 140, etc.), etc. In one example, computer user 145 may provide identification information 410 to computer device 140 automatically or manually. SDIM 170 may use identification information 410 and/or external information 420 to validate the identity claim for computer user 145. SDIM 170 may compare identification information 410 to information maintained in a database associated with SDIM 170 in order to assist in validating the identity claim for computer user 145. SDIM 170 may challenge computer user's 145 identity claim by requesting a password, requesting a biometric (e.g., such as speaking a challenge phrase, utilizing voice recognition, utilizing facial recognition, requesting a finger print, etc.), etc.

As further shown in FIG. 11, an appropriate individual and/or group identification (ID) to affiliate with the shared device may be determined (block 1130). For example, in implementations described above in connection with FIG. 4, if the identity claim of computer user 145 is validated, SDIM 170 may determine appropriate individual and/or group identification (ID) 440 to affiliate with the shared device (e.g., computer device 140). If computer user 145 is associated with an individual ID (e.g., an ID associated with a parent using a home computer for work), SDIM 170 may associate the individual ID with computer device 140 so that computer device 140 enables the parent to access information pertinent to his/her work (e.g., a server at work, work calendars, work contacts, work address books, work email accounts, etc.) as well as other information (e.g., the Internet, favorite web sites, bookmarks, etc.), etc. If computer user 145 is associated with a group ID (e.g., an ID associated with a family using a home computer), SDIM 170 may associate the group ID with computer device 140 so that computer device 140 enables the family (or family member) to access family-related content (e.g., favorite family web sites, prevention of access to adult content or certain web sites, etc.).

Returning to FIG. 11, appropriate shared device preferences and/or privileges may be applied based on the determined individual and/or group ID (block 1140). For example, in implementations described above in connection with FIG. 4, SDIM 170 may apply appropriate shared device preferences and/or privileges 450 to computer device 140 based on determined individual and/or group ID 440. Shared device preferences/privileges 450 may include preferences associated with the shared device (e.g., STB 120, computer device 140, hub telephone 150, etc.), preferences (e.g., bookmarks, calendars, contact lists, address books, favorite channels, etc.) and privileges (e.g., access rights to content provided by SDIM 170 or another content provider, parental filters, etc.) associated with approved users (e.g., TV user 135, computer user 145, hub user 165, etc.) of the shared device, etc. In one example, if computer user 145 is a young child, SDIM 170 may apply shared device preferences and/or privileges 450 that prevent the child from accessing inappropriate content on the Internet. If computer user 145 is an adult, SDIM 170 may apply shared device preferences and/or privileges 450 that enable the adult to access all content on the Internet.

Process block 1110 may include the process blocks depicted in FIG. 12. As shown in FIG. 12, process block 1110 may include one or more of receiving the identity claim automatically based on proximity to the shared device (block 1200) or receiving the identity claim manually from the user (block 1210), and retrieving information associated with the user and/or the shared device based on the identity claim (block 1220). For example, in implementations described above in connection with FIG. 4, computer user 145 may provide identification information 410 to computer device 140 automatically or manually. In one example, if computer user 145 possesses a mobile communication device and computer device 140 includes a wireless communication interface, computer device 140 may detect the mobile communication device when computer user 145 is within a certain distance from computer device 140. Computer device 140 may identify computer user 145 based on the detected mobile communication device, and may automatically provide identification information 410 to SDIM 170. SDIM 170 may use GPS and/or cell tower triangulation location information for user's 145 mobile communication device to automatically affiliate user 145 with computer device 140. Alternatively, computer user 145 may manually input identification information 410 (e.g., via a voice command, a keyboard, a keypad, etc.) to computer device 140, and may instruct computer device 140 to provide identification information 410 to SDIM 170. SDIM 170 may compare identification information 410 to information retrieved from and maintained in a database associated with SDIM 170 in order to assist in validating the identity claim for computer user 145.

Process block 1120 may include the process blocks depicted in FIG. 13. As shown in FIG. 13, process block 1120 may include retrieving information associated with the user and/or the shared device based on the identity claim (block 1300), generating a challenge request for the user (block 1310), receiving a user response to the challenge request (block 1320), and validating the identity claim based on the retrieved information and/or the user response to the challenge request (block 1330). For example, in implementations described above in connection with FIG. 5, identity claim validator 510 of SDIM 170 may compare identification information 410 to identification information 570 retrieved from and maintained in database 540 in order to assist in validating the identity claim. Identification information 570 may include user identifiers (e.g., account numbers, user names and/or passwords, etc.), user contact information (e.g., addresses, telephone numbers, email addresses, etc.), device identifiers (e.g., IP addresses, device names, etc.), etc. of users and/or shared devices associated with SDIM 170. Identity claim validator 510 may challenge the identity claim by issuing challenge 550 (e.g., requesting a password, requesting a biometric, etc.) to the shared device. The shared device may provide challenge response 560 to identity claim validator 510, and identity claim validator 510 may validate the identity claim based on challenge response 560.

Process block 1130 may include the process blocks depicted in FIG. 14. As shown in FIG. 14, process block 1130 may include retrieving individual and/or group ID information (block 1400), comparing the individual and/or group ID information to information associated with the user and/or the shared device (block 1410), and determining the appropriate individual and/or group ID based on the comparison (block 1420). For example, in implementations described above in connection with FIG. 5, individual/group ID determiner 520 of SDIM 170 may receive individual/group information 580 from database 540. Individual/group information 580 may include individual identification information (e.g., names, approved shared devices, historical information, etc. associated with individuals) and group identification information (e.g., group names, approved shared devices, etc. associated with groups). Individual/group ID determiner 520 may compare individual/group information 580 with identity claim validation indication 430 to determine appropriate individual/group ID 440 to affiliate with the shared device.

Process block 1140 may include the process blocks depicted in FIG. 15. As shown in FIG. 15, process block 1140 may include applying preferences and/or privileges associated with the user (block 1500), applying preferences and/or privileges associated with the shared device (block 1510), and/or applying preferences and/or privileges based on user presence information and/or external information (block 1520). For example, in implementations described above in connection with FIG. 5, preferences/privileges provider 530 of SDIM 170 may apply appropriate shared device preferences and/or privileges 450 (e.g., selected from preferences/privileges information 590) to the shared device based on determined individual and/or group ID 440. Preferences/privileges information 590 may include preferences (e.g., bookmarks, calendars, contact lists, address books, etc.) and privileges (e.g., access rights to content provided by SDIM 170 or another content provider, parental filters, etc.) associated with the shared device and/or associated with approved users of the shared device. In one example, SDIM 170 may apply preferences and/or privileges based on presence information (e.g., whether a user is actively using a shared device, as determined by whether the shared device has been idle for a predetermined amount of time) and/or external information (e.g., external information 420).

Systems and/or methods described herein may provide a mechanism for managing identities of users of communications-capable shared devices (e.g., televisions, telephones, mobile communications devices, PDAs, personal computers, STBs, portable media devices, etc.). The mechanism may enable users to affiliate or associate their identities (e.g., either automatically or manually) with communications-capable devices that may be shared by multiple and different users. In one implementation, for example, the systems and/or methods may receive an identity claim associated with a user of a shared device, and may validate the identity claim. The systems and/or methods may determine an appropriate individual and/or group identification to affiliate with the shared device, and may apply appropriate shared device preferences and/or privileges based on the determined individual and/or group identification.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 11-15, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method comprising:
  receiving, by a computing device, an identity claim associated with a user of a shared device;
  validating, by the computing device, the identity claim;
  determining, by the computing device, a group identification to associate with the shared device when the identity claim is validated,
    the group identification being associated with a plurality of users that includes the user; and applying, by the computing device, one or more preferences or one or more privileges to the shared device based on the group identification,
the applying of the one or more preferences or the one or more privileges to the shared device including one or more of:
applying, to the shared device, preferences and privileges associated with the plurality of users,
applying, to the shared device, preferences and privileges associated with the shared device, or
applying, to the shared device, preferences and privileges that are based on presence information that indicates that the user is actively using the share device or that the shared device is idle.

2. The method of claim 1, where receiving the identity claim comprises one of:
receiving the identity claim automatically when a user device, of the user, is within a particular distance from the shared device; or
receiving the identity claim via manual input by the user.

3. The method of claim 1, where validating the identity claim includes:
retrieving information associated with the user or the shared device based on the identity claim, and
validating the identity claim based on the information.

4. The method of claim 2, where the particular distance from the user device to the shared device is determined using one or more of:
a Global Positioning System (GPS),
cell tower triangulation,
a near-field mechanism,
a Bluetooth mechanism, or
a radio frequency identification (RFID) mechanism.

5. The method of claim 1, where validating the identity claim comprises:
retrieving information associated with the user or the shared device based on the identity claim;
generating a challenge request for the user;
receiving a user response to the challenge request; and
validating the identity claim based on the information and the user response to the challenge request.

6. The method of claim 5, where generating the challenge request comprises one or more of:
requesting a password from the user; or
requesting a biometric from the user.

7. The method of claim 6,
where generating the challenge request comprises requesting the biometric,
where requesting the biometric comprises:
requesting for the user to say a challenge phrase, or
requesting a finger print from the user, and
where validating the identity claim comprises one or more of:
utilizing voice recognition for the user;
utilizing biometrics information stored for the user; or
utilizing facial recognition for the user.

8. The method of claim 1, where determining the group identification comprises:
retrieving group information associated with the plurality of users;
comparing the group information to information associated with one of the user or the shared device; and
determining the group identification based on the comparing.

9. The method of claim 1, where the shared device comprises one or more of:
a television,
a telephone,
a mobile communications device,
a mobile Internet device (MID),
a personal digital assistant (PDA),
a personal computer,
a set-top box (STB),
a portable media device, or
a laptop computer.

10. The method of claim 1, where the identity claim comprises one or more of:
user contact information associated with the user,
a shared device identifier associated with the shared device,
a first user identifier associated with the user during a first period of time when the user is using the shared device to work from home,
a second user identifier associated with the user during a second period of time that is different from the first period of time,
the presence information, or
location information associated with the shared device.

11. The method of claim 1, where validating the identity claim comprises:
validating the identity claim based on one or more of a calendar month, a time of day, or a day of week.

12. A device comprising:
a processor to:
receive an identity claim associated with a user of a shared device,
the identity claim including one or more of:
user contact information associated with the user,
a shared device identifier associated with the shared device,
a first user identifier associated with the user during a first particular period of time,
a second user identifier associated with the user during a second particular period of time that is different from the first particular period of time,
presence information that indicates that the user is actively using the shared device or that the shared device is idle, or
location information associated with the shared device, determine whether the identity claim is valid,
determine a group identification to affiliate with the shared device when the identity claim is valid,
the group identification being associated with a plurality of users that includes the user, and
provide one or more preferences or one or more privileges to the shared device based on the group identification.

13. The device of claim 12, where the shared device comprises one or more of:
a television,
a telephone,
a mobile communications device,
a mobile Internet device (MID),
a personal digital assistant (PDA),
a personal computer,
a set-top box (STB),
a portable media device, or
a laptop computer.

14. The device of claim 12, where, when receiving the identity claim, the processor is to:
receive the identity claim automatically when a user device, of the user, is within a particular distance from the shared device, or
receive the identity claim via manual input by the user.

15. The device of claim 14, where, when determining whether the identity claim is valid, the processor is to:
  retrieve information associated with the user or the shared device based on the identity claim, and
  determine whether the identity claim is valid based on the information.

16. The device of claim 14, where the particular distance from the user device to the shared device is determined using one or more of:
  a Global Positioning System (GPS),
  cell tower triangulation,
  a near-field mechanism,
  a Bluetooth mechanism, or
  a radio frequency identification (RFID) mechanism.

17. The device of claim 12, where, when determining whether the identity claim is valid, the processor is to:
  retrieve information associated with the user or the shared device based on the identity claim,
  generate a challenge request for the user,
  receive a user response to the challenge request, and
  determine whether the identity claim is valid based on one or more of the information and the user response to the challenge request.

18. The device of claim 17, where, when generating the challenge request, the processor is to:
  request a password from the user, or
  request a biometric from the user.

19. The device of claim 12, where, when determining the group identification, the processor is to:
  retrieve group information associated with the plurality of users,
  compare the group information to information associated with one of the user or the shared device, and
  determine the group identification based on the comparing.

20. The device of claim 12, where, when applying the one or more preferences or the one or more privileges to the shared device, the processor is to:
  apply, to the shared device, preferences and privileges associated with the plurality of users,
  apply, to the shared device, preferences and privileges associated with the shared device, or
  apply, to the shared device, preferences and privileges that are based on the presence information.

21. A non-transitory computer-readable medium comprising:
  one or more instructions that, when executed by at least one processor, cause the at least one processor to:
    receive an identity claim associated with a user of a shared device,
      the identity claim including one or more of:
        user contact information associated with the user,
        a shared device identifier associated with the shared device,
        a first user identifier associated with the user during a first particular period of time,
        a second user identifier associated with the user during a second particular period of time that is different from the first particular period of time,
        presence information that indicates that the user is actively using the shared device or that the shared device is idle, or
        location information associated with the shared device;
    validate the identity claim;
    determine a group identification to associate with the shared device when the identity claim is validated,
      the group identification being associated with a plurality of users that includes the user; and
    apply one or more preferences and privileges to the shared device based on the group identification associated with the shared device.

22. The non-transitory computer-readable medium of claim 21, where the one or more instructions to receive the identity claim associated with the user of the shared device include:
  one or more instructions that, when executed by the at least one processor, cause the at least one processor to:
    receive the identity claim from a user device, associated with the user, via the shared device.

23. The non-transitory computer-readable medium of claim 21, further comprising:
  one or more instructions that, when executed by the at least one processor, cause the at least one processor further to:
    determine an individual identification to associate with the shared device when the identity claim is validated,
      the individual identification being associated with only the user; and
    apply one or more other preferences and privileges to the shared device based on the individual identification.

24. The non-transitory computer-readable medium of claim 21, where the one or more instructions to apply the one or more preferences or the one or more privileges to the shared device include:
  one or more instructions that, when executed by the at least one processor, cause the at least one processor further to:
    apply, to the shared device, preferences and privileges associated with the plurality of users,
    apply, to the shared device, preferences and privileges associated with the shared device, or
    apply, to the shared device, preferences and privileges that are based on the presence information.

25. The non-transitory computer-readable medium of claim 21, where the one or more instructions to validate the identity claim include:
  one or more instructions that, when executed by the at least one processor, cause the at least one processor further to:
    receive timing information associated with the identity claim,
    generate a challenge request for the user based on the identity claim;
    receive a user response to the challenge request;
    validate the identity claim based on the user response to the challenge request and the timing information.

* * * * *